US012001289B2

(12) United States Patent
Xu et al.

(10) Patent No.: US 12,001,289 B2
(45) Date of Patent: Jun. 4, 2024

(54) DATA RECOVERY METHOD, APPARATUS AND DEVICE, AND READABLE STORAGE MEDIUM

(71) Applicant: Inspur Electronic Information Industry Co., Ltd., Shandong (CN)

(72) Inventors: Yinlong Xu, Shandong (CN); Xiangrui Meng, Shandong (CN)

(73) Assignee: Inspur Electronic Information Industry Co., Ltd., Shandong (CN)

( * ) Notice: Subject to any disclaimer, the term of this patent is extended or adjusted under 35 U.S.C. 154(b) by 130 days.

(21) Appl. No.: 17/771,614

(22) PCT Filed: May 28, 2020

(86) PCT No.: PCT/CN2020/092833
§ 371 (c)(1),
(2) Date: Apr. 25, 2022

(87) PCT Pub. No.: WO2021/077746
PCT Pub. Date: Apr. 29, 2021

(65) Prior Publication Data
US 2022/0413965 A1   Dec. 29, 2022

(30) Foreign Application Priority Data
Oct. 25, 2019   (CN) .......................... 201911025159.8

(51) Int. Cl.
*G06F 11/14*   (2006.01)
(52) U.S. Cl.
CPC ...... *G06F 11/1448* (2013.01); *G06F 2201/84* (2013.01)
(58) Field of Classification Search
CPC ..... G06F 11/1448; G06F 16/16; G06F 16/172
See application file for complete search history.

(56) References Cited

U.S. PATENT DOCUMENTS 6,449,688 B1 *   9/2002   Peters ............... H04N 21/6581
                                                     711/170
7,730,351 B2     6/2010   Robinson et al.
(Continued)

FOREIGN PATENT DOCUMENTS

CN   101515296 A   8/2009
CN   106227731 A   12/2016
(Continued)

OTHER PUBLICATIONS

International Search Report dated Aug. 26, 2020; International Application PCT/CN2020/092833.

*Primary Examiner* — Tarek Chbouki
(74) *Attorney, Agent, or Firm* — DINSMORE & SHOHL LLP

(57) ABSTRACT

A data recovery method, apparatus and device, and a readable storage medium are provided. The method comprises: receiving and analyzing a data recovery request, and obtaining a total cluster data recovery amount and a total local data recovery amount; determining a basic recovery speed by means of the total cluster data recovery amount and the total local data recovery amount; performing data recovery, and compiling statistics on a proportion of recovered small files within a specified number of recovery periods; and adjusting the basic recovery speed by means of the proportion of the small files, and performing data recovery according to the adjusted basic recovery speed. In the method, a basic recovery speed can be adjusted in accordance with the small file recovery proportion, such that the overall efficiency of data recovery can be improved, and the influence on a front-end service of a user can also be reduced.

8 Claims, 3 Drawing Sheets

(56) References Cited

U.S. PATENT DOCUMENTS

| | | | |
|---|---|---|---|
| 2003/0126247 A1 | 7/2003 | Strasser et al. | |
| 2007/0016837 A1* | 1/2007 | Candes | H03M 13/37 |
| | | | 714/746 |
| 2009/0313626 A1* | 12/2009 | Dawson | G06Q 10/06 |
| | | | 718/100 |
| 2013/0268493 A1* | 10/2013 | Berman | G06F 11/1469 |
| | | | 707/649 |
| 2014/0012815 A1* | 1/2014 | Ueno | G06F 16/90 |
| | | | 707/679 |
| 2016/0162366 A1* | 6/2016 | Oberhofer | G06F 16/17 |
| | | | 707/645 |
| 2016/0350015 A1* | 12/2016 | Luo | G06F 12/0246 |
| 2019/0227877 A1* | 7/2019 | Pandey | G06F 16/128 |
| 2019/0332781 A1* | 10/2019 | Natanzon | G06F 3/065 |

FOREIGN PATENT DOCUMENTS

| | | | | |
|---|---|---|---|---|
| CN | 109684294 A | | 4/2019 | |
| CN | 110287164 A | * | 9/2019 | ......... G06F 11/1469 |
| CN | 110795284 A | | 2/2020 | |
| CN | 107026708 B | * | 6/2020 | ......... H04L 1/0002 |

* cited by examiner

DATA RECOVERY METHOD, APPARATUS AND DEVICE, AND READABLE STORAGE MEDIUM

CROSS-REFERENCE TO RELATED APPLICATIONS

This application is the U.S. National Stage of PCT/CN2020/092833 filed on May 28, 2020, which claims the priority of Chinese patent application No. 201911025159.8, filed with the Chinese Patent Office on Oct. 25, 2019, the contents of which are incorporated herein by reference in its entirety.

FIELD OF THE INVENTION

The present application relates to the technical field of storage, in particular to a data recovery method, apparatus and device, and a readable storage medium.

BACKGROUND OF THE INVENTION

With the rise and popularity of cloud computing technology, the distributed shared storage system is increasingly concerned in the industry. Continuous and stable performance is required in the scenarios of video monitoring and broadcasting media.

Currently, in a failure scenario, data recovery has a great impact on performance and may lead to abnormal business access, so the speed of data reconstruction should be controlled to reduce the influence of data reconstruction on business; in addition, when disk failure and node failure occur in the cluster, in order to avoid data loss, data recovery and balancing should be completed as soon as possible, so the data recovery speed should be improved at the same time to ensure that data recovery may be completed in a short time.

Currently, in a distributed storage system, both large and small files may be stored, i.e., the objects stored at a bottom layer include small objects and large objects. When data is recovered in a failure scenario, the number of small objects is large, and the recovery time of individual objects is short; the number of large objects is relatively small, and the recovery time of individual objects is long. Therefore, when data is recovered in the failure scenario, it is difficult to achieve the purpose of data recovery as soon as possible while ensuring the business of the user.

In summary, how to effectively solve the problem of data recovery of the storage cluster is a technical problem to be urgently solved by those skilled in the art.

SUMMARY OF THE INVENTION

The object of the present application is to provide a data recovery method, apparatus and device, and a readable storage medium, to achieve the purpose of data recovery as soon as possible while ensuring the business of the user.

In order to solve the above technical problem, the present application provides the following technical solution:

a data recovery method is provided, including:
receiving and analyzing a data recovery request sent by a monitoring node, and obtaining a total cluster data recovery amount and a total local data recovery amount;
determining a basic recovery speed by means of the total cluster data recovery amount and the total local data recovery amount;
performing data recovery according to the basic recovery speed, and compiling statistics on a proportion of recovered small files within a specified number of recovery periods; and
adjusting the basic recovery speed by means of the proportion of the small files, and performing data recovery according to the adjusted basic recovery speed.

Preferably, determining a basic recovery speed by means of the total cluster data recovery amount and the total local data recovery amount includes:
communicating and interacting with the monitoring node, to determine a cluster recovery speed;
calculating a ratio of the total local data recovery amount to the total cluster data recovery amount; and
using the product of the cluster recovery speed and the ratio as the basic recovery speed.

Preferably, adjusting the basic recovery speed by means of the proportion of the small files includes: up-regulating the basic recovery speed when the proportion of the small files is greater than a first threshold; and
down-regulating the basic recovery speed when the proportion of the small files is less than a second threshold.

Preferably, up-regulating the basic recovery speed includes:
increasing the number of objects to be recovered at the same time, and increasing the number of objects allowed to be recovered within a single recovery period. Preferably, down-regulating the basic recovery speed includes:
decreasing the number of objects to be recovered at the same time, and decreasing the number of objects allowed to be recovered within a single recovery period. Preferably, performing data recovery according to the basic recovery speed includes:
determining whether the data recovery speed in the current recovery period is greater than the basic recovery speed;
if so, stopping data recovery for the current recovery period;
if not, continuing data recovery.

Preferably, before receiving and analyzing a data recovery request sent by a monitoring node, the method further includes:
when a storage cluster is in failure, feeding back failure information to the monitoring node, such that the monitoring node may compile statistics on the total cluster data recovery amount and determine the total local data recovery amount based on the failure information.

A data recovery apparatus is provided, including:
a data amount determining module, configured to receive and analyze a data recovery request sent by a monitoring node, and obtain a total cluster data recovery amount and a total local data recovery amount;
a recovery speed determining module, configured to determine a basic recovery speed by means of the total cluster data recovery amount and the total local data recovery amount;
a data recovery module, configured to perform data recovery according to the basic recovery speed, and compile statistics on a proportion of recovered small files within a specified number of recovery periods; and
a recovery speed adjustment module, configured to adjust the basic recovery speed by means of the proportion of the small files, and perform data recovery according to the adjusted basic recovery speed.

A data recovery device is provided, including:

a memory, configured to store computer programs; and a processor, configured to implement, when executing the computer programs, the steps of the above data recovery method. A readable storage medium is provided, wherein the readable storage medium stores a computer program, and the computer program implements, when being executed by the processor, the steps of the above data recovery method.

When the method provided in the embodiment of the present application is applied, the data recovery request sent by a monitoring node is received and analyzed, to obtain the total cluster data recovery amount and the total local data recovery amount; a basic recovery speed is determined by means of the total cluster data recovery amount and the total local data recovery amount; data recovery is performed according to the basic recovery speed, and the proportion of recovered small files within a specified number of recovery periods is subjected to compiling statistics; and the basic recovery speed is adjusted by means of the proportion of the small files, and data recovery is performed according to the adjusted basic recovery speed.

In consideration that in a storage cluster, many small files are available, but the recovery speed is fast, and few large files are available, but the recovery speed is slow. Before recovery, whether the object to be recovered is a large file or a small file may not be determined in advance. Therefore, in the present method, after receiving a data recovery request sent by a monitoring node, the total cluster data recovery amount and the total local data recovery amount may be determined. Afterwards, the basic recovery speed is determined using the total cluster data recovery amount and the total local data recovery amount, and the data is recovered according to the basic recovery speed. During data recovery, the proportion of recovered small files within a specified number of recovery periods is subjected to compiling statistics, and the basic recovery speed is adjusted based on the proportion of the small files, and data may be recovered at an adjusted basic recovery speed in subsequent recovery periods. As can be seen that, in the present method, the basic recovery speed may be adjusted based on the proportion of recovered small files within the current recovery period and in accordance with the small file recovery proportion, thereby not only quickening the overall efficiency of data recovery, but also reducing the influence on a front-end service of a user.

Correspondingly, embodiments of the present application further provide a data recovery apparatus and device corresponding to the above data recovery method and a readable storage medium, which have the above technical effects, and will not be repeated redundantly herein.

BRIEF DESCRIPTION OF THE DRAWINGS

In order to more clearly illustrate the technical solutions in the embodiments of the present application or the prior art, a brief introduction will be given below on the drawings which need to be used in the description of the embodiments or the prior art, apparently, the drawings in the following description are merely some embodiments of the present application, and those skilled in the art may also obtain other drawings according to these drawings without any creative effort.

DETAILED DESCRIPTION OF THE INVENTION

In order that those skilled in the art may better understand the solution of the present application, the present application will be described in further details below in combination with the accompanying drawings and specific embodiments. Obviously, the described embodiments are merely some but not all of the embodiments of the present application. Based on the embodiments in the present application, all the other embodiments obtained by those skilled in the art without any creative effort shall all fall within the protection scope of the present application.

Embodiment 1

Figure 1:
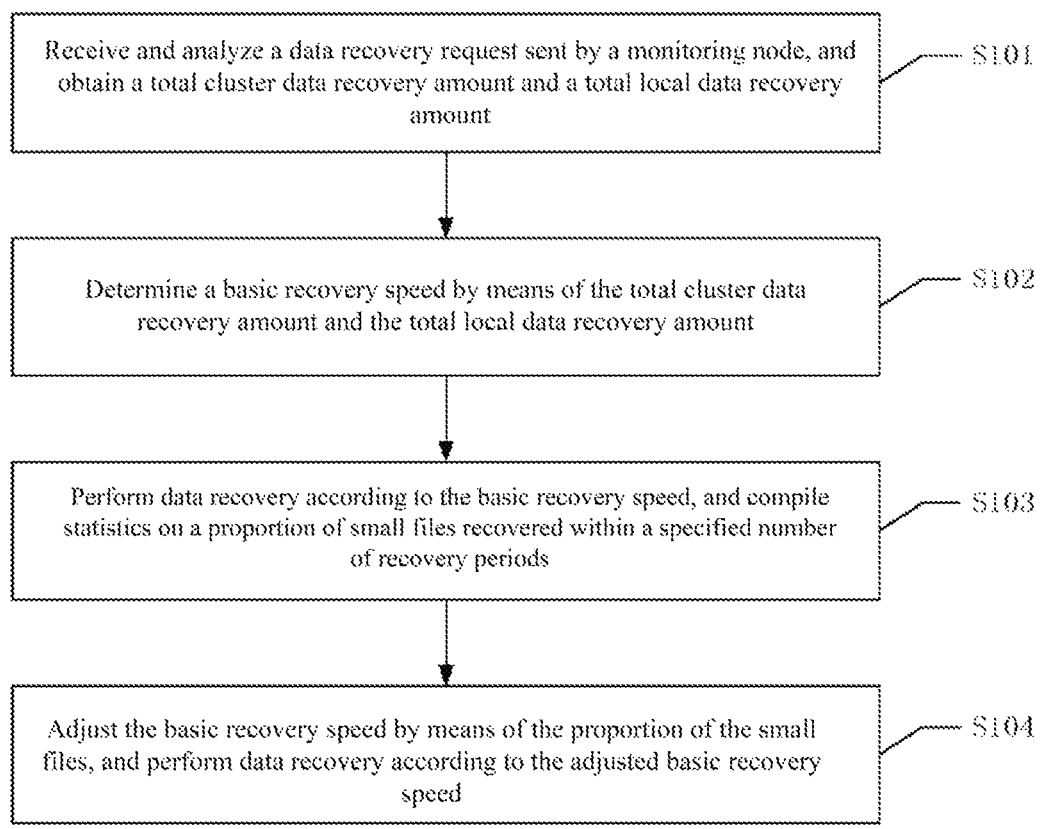
FIG. 1 is a flow chart of implementation of a data recovery method in an embodiment of the present application.

Please refer to FIG. 1 which is a flow chart of a data recovery method in an embodiment of the present application, the method may be applied to a distributed shared storage system (that is, a storage cluster), and the method includes the following steps:

S101, receiving and analyzing a data recovery request sent by a monitoring node, and obtaining a total cluster data recovery amount and a total local data recovery amount.

When the storage node (MON, Monitor) in a storage cluster receives a data recovery request sent by the monitoring node in the storage cluster, the data recovery request may be analyzed, to determine the total cluster data recovery amount and the total local data recovery amount.

Specifically, before receiving and analyzing the data recovery request sent by the monitoring node, the storage node feeds back failure information to the monitoring node when the storage cluster is in failure, such that the monitoring node compiles statistics on the total cluster data recovery amount according to failure information, and determines the total local data recovery amount. Wherein the monitoring node may determine whether the current storage cluster is in failure through detection, if a failure occurs, whether data recovery is required is further determined; if data recovery is required, the total cluster data recovery amount that needs to be recovered from a cluster failure is subjected to compiling statistics respectively from the information reported by the storage node, and is sent to each storage node at the same time, and the total local data recovery amount of each storage node is notified.

S102, determining a basic recovery speed by means of the total cluster data recovery amount and the total local data recovery amount.

The basic recovery speed is just the size of data recovered per unit of time locally. In the implementation at a bottom layer, the number of objects allowed be recovered in one recovery period may be given in terms of 1 M-sized objects of the object to be recovered. For example, when the basic recovery speed is X and the recovery period is t, that is, the size of the data recovered in a single period is xt, and after dividing xt by 1 M, the result is just the number of objects that are recovered in a single period.

In the present embodiment, the basic recovery speed may be determined specifically according to the total cluster data recovery amount and the total local data recovery amount. The specific implementation process may include:

Step 1, communicating and interacting with the monitoring node, to determine a cluster recovery speed;

Step 2, calculating a ratio of the total local data recovery amount to the total cluster data recovery amount; and Step 3, using the product of the cluster recovery speed and the ratio as the basic recovery speed.

To facilitate description, a description is given below by combining the above three steps.

The storage node may send a request to the monitoring node to obtain the cluster recovery speed S. Then, the ratio N/M of the total local data recovery amount N to the total cluster data recovery amount M is calculated. Then, the cluster recovery speed S is multiplied with the ratio N/M to obtain the basic recovery speed L, i.e., L=N/M·S.

Of course, in other embodiments of the present application, a basic recovery speed may also be directly preset, and the basic recovery speed is obtained either by directly reading the storage medium or by requesting the monitoring node to allocate.

S103, performing data recovery according to the basic recovery speed, and compiling statistics on a proportion of recovered small files within a specified number of recovery periods.

Wherein the specific size of small files may be set according to the application environment, and generally files smaller than 512 KB may be considered as small files. For example, in the application scenarios where there are many pictures and documents, the small files may be specifically set as the files with a size of 64 KB or less. Accordingly, the specific size of large files may also be set according to the application environment, and generally files larger than or equal to 1 M may be considered as large files. In other words, the number of small files is much larger than the number of large files (e.g., hundreds or thousands of times larger files) after dividing files according to requirements.

After the basic recovery speed is obtained, data may be recovered according to the basic recovery speed. When data is recovered, the proportion of recovered small files within a specified number of recovery periods may be subjected to compiling statistics. That is, while performing data recovery, whether the currently recovered object belongs to a large file or a small file is recorded, and then the proportion of small files within a specified number of recovery periods is computed, wherein the specified number may be set to 50, of course, other values may also be set according to the needs of specific scenarios. Wherein, data is recovered according to the basic recovery speed, including:

Step 1, determining whether the data recovery speed in the current recovery period is greater than the basic recovery speed; step 2, if so, stopping data recovery in the current recovery period;

Step 3, if not, continuing data recovery.

That is, in the implementation at a bottom layer, whether the number of recovered objects (files) in the current recovery period is greater than the number of objects corresponding to the basic recovery speed is subjected to compiling statistics. If so, the data recovery of the current recovery period may stop; if the number of recovered objects is less than the number of objects corresponding to the basic recovery speed, data recovery may continue until the number of objects corresponding to the basic recovery speed is reached.

S104, the basic recovery speed is adjusted using the proportion of small files, and data recovery is performed according to the adjusted basic recovery speed.

The number of small files in the storage cluster is large, and the recovery speed is fast; the number of large files in the storage cluster is small, and the recovery speed is slow. While the data recovery speed is too slow, if the data accessed by the user has not been recovered, the access will be unresponsive; if the data recovery speed is too fast, system resources will be occupied, resulting in a failure to respond to user access requests. That is, too fast or too slow data recovery has an impact, and whether the recovery object is a large file or a small file also has an impact on the data recovery speed. Specifically, when small files are recovered, a faster recovery speed is desired, and when large files are recovered, a slower recovery speed is desired, to match the respective data recovery speed of large and small files to achieve the purpose of recovering speed as soon as possible without affecting the response to the front-end service of a user.

Based on this, in the present embodiment, the proportion of small files may be used to adjust the basic recovery speed. In this way, data may be recovered at an adjusted basic recovery speed in subsequent recovery periods.

Specifically, the adjustment process of the basic recovery speed may include the following cases:

case 1: up-regulating the basic recovery speed when the proportion of the small files is greater than a first threshold;

case 2: down-regulating the basic recovery speed when the proportion of the small files is less than a second threshold; and case 3: maintaining the basic recovery speed unchanged if the proportion of the small files is greater than or equal to the second threshold and less than or equal to the first threshold.

Wherein, relationship terms such as first and second are merely used to distinguish one entity or operation from another entity or operation, and do not necessarily require or imply any such actual relationship or order between those entities or operations.

Wherein the first threshold and the second threshold may be set in advance, for example, the first threshold may be set to 80% (or other values, for example, 85%), and the second threshold may be set to 20% (or other values, for example, 15%).

Wherein up-regulating the basic recovery speed means increasing the number of objects to be recovered at the same time (for example, reduced by 50%, or other proportions or quantities), and increasing the number of objects allowed to be recovered within a single recovery period (for example, reduced by 50%, or other proportions or quantities).

Correspondingly, down-regulating the basic recovery speed means reducing the number of objects to be recovered at the same time (for example, increased by 50%, or other proportions or quantities), and reducing the number of objects allowed to be recovered within a single recovery period (for example, increased by 50%, or other proportions or quantities).

The basic recovery speed is maintained unchanged, that is, the number of objects to be recovered at the same time is maintained, and the number of objects allowed to be recovered within a single recovery period is maintained.

When the method provided in the embodiment of the present application is applied, the data recovery request sent by a monitoring node is received and analyzed, to obtain the total cluster data recovery amount and the total local data recovery amount; a basic recovery speed is determined by means of the total cluster data recovery amount and the total local data recovery amount; data recovery is performed according to the basic recovery speed, and the proportion of recovered small files within a specified number of recovery periods is subjected to compiling statistics; and the basic recovery speed is adjusted by means of the proportion of the small files, and data recovery is performed according to the adjusted basic recovery speed.

In consideration that in a storage cluster, many small files are available, but the recovery speed is fast, and few large files are available, but the recovery speed is slow. Before recovery, whether the object to be recovered is a large file or a small file may not be determined in advance. Therefore, in the present method, after receiving a data recovery request from a monitoring node, the total cluster data recovery amount and the total local data recovery amount may be determined. Afterwards, the basic recovery speed is determined using the total cluster data recovery amount and the total local data recovery amount, and the data is recovered according to the basic recovery speed. During data recovery, the proportion of recovered small files within a specified number of recovery periods is subjected to compiling statistics, and the basic recovery speed is adjusted based on the proportion of the small files, and data may be recovered at an adjusted basic recovery speed in subsequent recovery periods. As can be seen that, in the present method, the basic recovery speed may be adjusted based on the proportion of recovered small files within a current recovery period and in accordance with the small file recovery proportion, thereby not only quickening the overall efficiency of data recovery, but also reducing the influence on a front-end service of a user.

In order to facilitate a better understanding of the data recovery method provided by the embodiments of the present application by those skilled in the art, the following is a detailed description of the data recovery method with a specific application scenario as an example.

This method may be applied to include a monitoring module (i.e., a monitoring node), one client, and three or more object-based storage device nodes (i.e., storage nodes). The cluster monitoring node may set the recovery speed of the storage cluster; when the storage cluster is in failure and needs to recover data, the monitoring node compiles statistics on the amount of data that the cluster needs to recover and sends to the storage node; then, when a single storage node starts to recover data, the basic recovery speed of the storage node in the reconstruction period is obtained by computing the object needs to be recovered on the storage node and the amount of data that needs to be restored by a storage pool obtained from the monitoring node; and finally, a single storage node compiles statistics on the proportion of the number of small objects recovered within a certain recovery period. When a certain threshold is exceeded, the number of objects to be recovered at the same time and the number of objects allowed to be recovered within the recovery period are increased to speed up the recovery of small objects; if the number is lower than a certain threshold, the number of objects to be recovered at the same time and the number of objects allowed to be recovered within the recovery period are reduced during data recovery, so as to reduce the influence on the front-end service of a user, and adaptively adjust the recovery strategy of a single storage node, thereby achieving the purpose of not affecting the front-end service of a user, but also improving the speed of data recovery.

The data recovery method includes the following specific steps:
A. A user sets the recovery speed of the storage cluster;
B. The storage cluster MON (monitoring node) judges whether the current cluster is in failure or not and whether data recovery is required through detection. If data recovery is required, turn to step (C); if data recovery is not required, turn to step (H);
C. The cluster monitoring node respectively compiles statistics on the amount of data that needs to be recovered from the cluster failure from the information reported by the storage node and sends to each storage node;
D. The individual storage node (OSD) determines the recovery speed allowed in the recovery period of the storage node based on the ratio of the amount of data to be recovered locally to the amount of data to be recovered from the cluster failure, and at the same time, the storage node compiles statistics on the number of small objects recovered in the recovery cycle and adjusts the policy to modify the set recovery rate;
wherein the setting manner of the recovery speed of a single storage node is obtained through the following steps:
 (1) the storage node requests to the monitoring node, to obtain the recovery speed S of the entire cluster configuration and the number of objects to be recovered by the cluster M;
 (2) the storage node obtains the number of objects to be recovered locally N;
 (3) the storage node obtains the basic recovery speed of the storage node by dividing the number of objects to be recovered locally N by the ratio N/M of the number of objects to be recovered by the cluster M, and multiplied by the set cluster recovery speed S, and gives the number of objects allowed to be recovered in terms of 1 M-sized objects of the object to be recovered;
 (4) The storage node compiles statistics on the proportion of small objects in the actually recovered objects in 50 recovery periods, and when the proportion exceeds a certain threshold (80% of the experience value), the number of objects to be recovered at the same time and the number of objects allowed to be recovered within the recovery period are increased, to speed up the recovery of small objects; if the proportion is lower than a certain threshold (20% of the experience value), the number of objects to be recovered at the same time and the number of objects allowed to be recovered in the recovery period are reduced when data recovery is performed.
 (5) the storage node stores the number of objects allowed to be recovered, and waits for the next timing adjustment, and the flow is finished;
E. when the storage node starts recovery, first check whether the recovery speed has exceeded the set recovery speed, if so, turn to step G, otherwise turn to step F;
F. enter the normal data recovery flow, and start to recover data on the storage node;
G. at the end of the current recovery period, determine whether the cluster still has data to be recovered, if there is no data to be recovered, then turn to step H, otherwise turn to step C for the recovery of the next recovery period;
H. the recovery is finished, to wait for the next failure detection.

As can be seen that, the data recovery method may speed up the recovery of small objects by compiling statistics on a ratio of the number of small objects recovered within a certain recovery period when the cluster failure is recovered, and by increasing the number of objects to be recovered at the same time and the number of objects allowed to be recovered within the recovery period when the number exceeds a certain threshold; and the number of objects to be recovered at the same time and the number of objects allowed to be recovered within the recovery period are reduced when the number is lower than a certain threshold, so as to reduce the influence on the front-end service of a user, thereby allowing adaptive adjustment of the recovery strategy based on the situation of the actually recovered data, which does not affect the front-end service of a user and improves the speed of data recovery.

Embodiment 2

Corresponding to the above method embodiment, embodiments of the present application further provide a data recovery apparatus, and the data recovery apparatus described below and the data recovery method described above may be referenced with each other.

Figure 2:
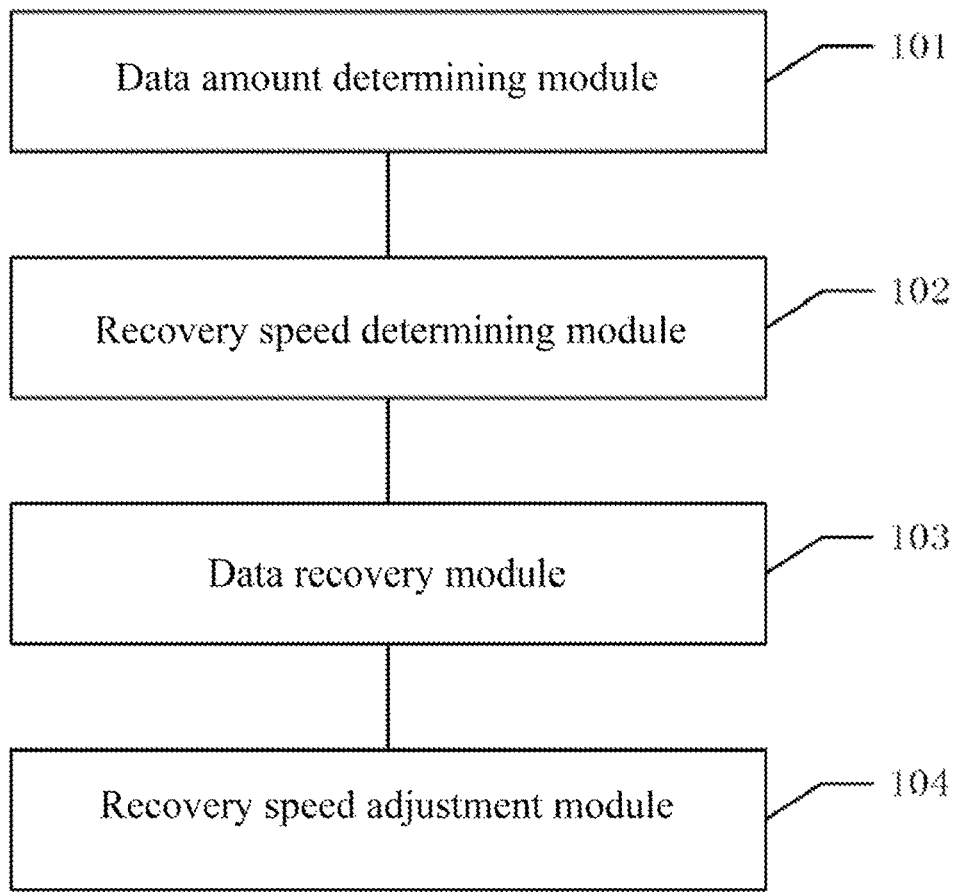
FIG. 2 is a structural schematic diagram of a data recovery apparatus in an embodiment of the present application.

Please refer to FIG. 2, the apparatus includes the following modules:
- a data amount determining module 101, configured to receive and analyze a data recovery request sent by a monitoring node, and obtain a total cluster data recovery amount and a total local data recovery amount;
- a recovery speed determining module 102, configured to determine a basic recovery speed by means of the total cluster data recovery amount and the total local data recovery amount;
- a data recovery module 103, configured to perform data recovery according to the basic recovery speed, and compile statistics on a proportion of small files recovered within a specified number of recovery periods; and
- a recovery speed adjustment module 104, configured to adjust the basic recovery speed by means of the proportion of the small files, and perform data recovery according to the adjusted basic recovery speed.

The apparatus provided in the embodiments of the present application receives and analyzes a data recovery request sent by a monitoring node, and obtains a total cluster data recovery amount and a total local data recovery amount; determines a basic recovery speed by means of the total cluster data recovery amount and the total local data recovery amount; performs data recovery according to the basic recovery speed, and compiles statistics on the proportion of small files recovered within a specified number of recovery periods; and adjusts the basic recovery speed by means of the proportion of the small files, and performs data recovery according to the adjusted basic recovery speed.

In consideration that in a storage cluster, many small files are available, but the recovery speed is fast, and few large files are available, but the recovery speed is slow. Before recovery, whether the object to be recovered is a large file or a small file may not be determined in advance. Therefore, in the present apparatus, after receiving a data recovery request from a monitoring node, the total cluster data recovery amount and the total local data recovery amount may be determined. Afterwards, the basic recovery speed is determined using the total cluster data recovery amount and the total local data recovery amount, and the data is recovered according to the basic recovery speed. During data recovery, the proportion of small files recovered within a specified number of recovery periods is subjected to compiling statistics, and the basic recovery speed is adjusted based on the proportion of the small files, and data may be recovered at an adjusted basic recovery speed in subsequent recovery periods. As can be seen that, in the present apparatus, the basic recovery speed may be adjusted based on the proportion of small files recovered within the current recovery period and in accordance with the small file recovery proportion, thereby not only quickening the overall efficiency of data recovery, but also reducing the influence on a front-end service of a user.

In a specific embodiment of the present application, the recovery speed determining module 102 is specifically configured to communicate and interact with the monitoring node, to determine the cluster recovery speed; compute a ratio of the total local data recovery amount to the total cluster data recovery amount; and use the product of the cluster recovery speed and the ratio as the basic recovery speed.

In a specific embodiment of the present application, the recovery speed adjustment module 104 includes:
- an up-regulating unit, configured to up-regulate the basic recovery speed when the proportion of the small files is greater than a first threshold; and a down-regulating unit, configured to down-regulate the basic recovery speed when the proportion of the small files is less than a second threshold.

In a specific embodiment of the present application, the up-regulating unit is specifically configured to increase the number of objects to be recovered at the same time, and increase the number of objects allowed to be recovered within a single recovery period.

In a specific embodiment of the present application, the down-regulating unit is specifically configured to reduce the number of objects to be recovered at the same time, and decrease the number of objects allowed to be recovered within a single recovery period.

In a specific embodiment of the present application, the data recovery module 103 is specifically configured to determine whether the data recovery speed in the current recovery period is greater than the basic recovery speed; if so, stop data recovery of the current recovery period; if not, continue data recovery.

In a specific embodiment of the present application, the failure information feedback module is configured to feed back failure information to the monitoring node when the storage cluster is in failure before receiving and analyzing the data recovery request sent by the monitoring node, such that the monitoring node may compile statistics on the total cluster data recovery amount according to the failure information and determine the total local data recovery amount.

Embodiment 3

Corresponding to the above method embodiment, embodiments of the present application further provide a data recovery device, the data recovery device described below and the data recovery method described above may be referenced with each other.

Figure 3:
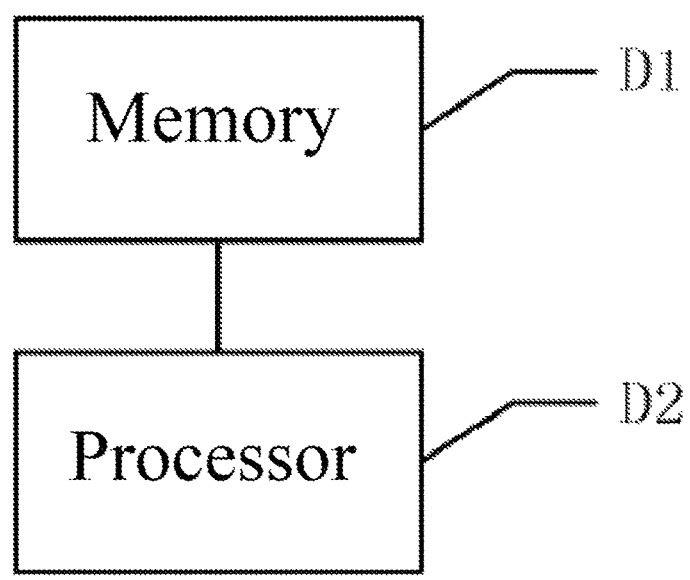
FIG. 3 is a structural schematic diagram of a data recovery device in an embodiment of the present application.

Please refer to FIG. 3, the data recovery device includes:
- a memory D1, configured to store computer programs; and
- a processor D2, configured to implement the steps of the data recovery method in the above method embodiment when executing the computer programs.

Figure 4:
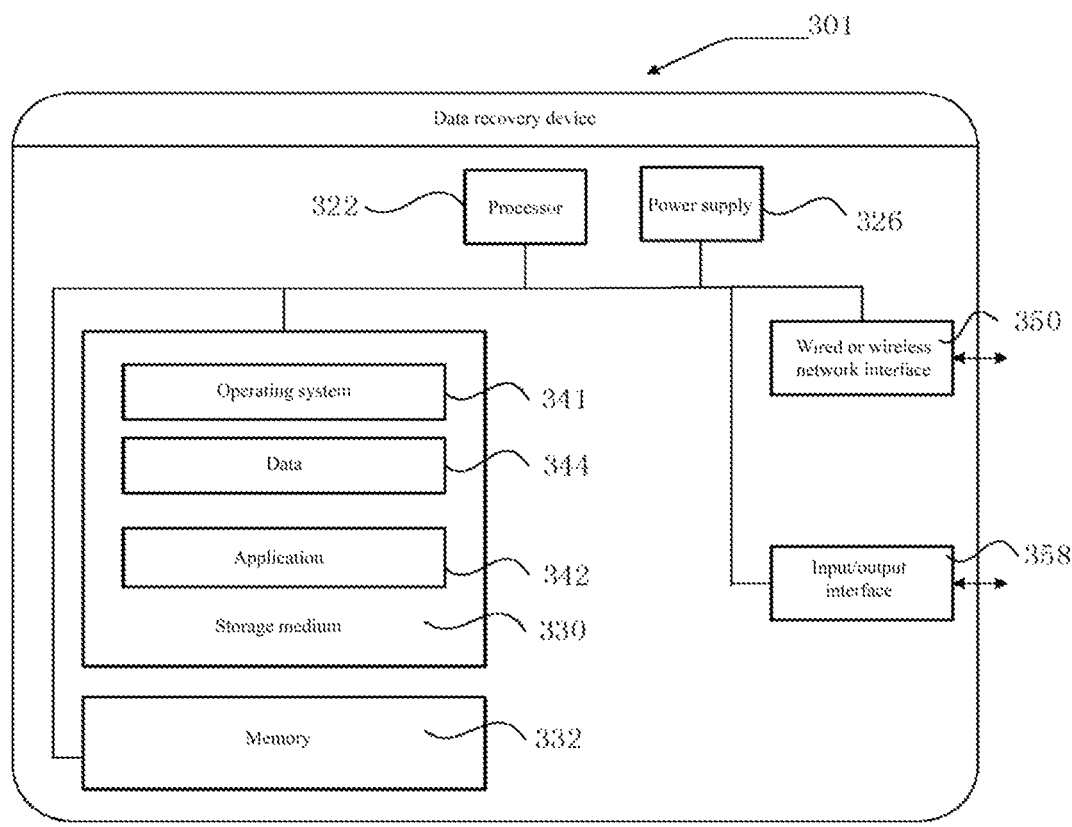
FIG. 4 is a schematic diagram of the specific structure of a data recovery device in an embodiment of the present application.

Specifically, please refer to FIG. 4 which is a schematic diagram of a specific structure of a data recovery device provided in the present embodiment, and the data recovery device may vary greatly due to a difference in configuration or performance, and may include one or more processors (central processing units (CPUs) 322 (e.g., one or more processors) and a memory 332, and the storage medium 330 (e.g., one or more mass storage devices) that stores applications 342 or data 344. Wherein, the memory 332 and the storage medium 330 may be ephemeral storage or persistent storage. The program stored in the storage medium 330 may include one or more modules (not shown in the figure), and each module may include a series of instruction operations in the data processing device. Further, the central processor 322 may be set to communicate with the storage medium 330 to execute a series of instruction operations in the storage medium 330 on the data recovery device 301.

The data recovery device 301 may also include one or more power supplies 326, one or more wired or wireless network interfaces 350, one or more input/output interfaces 358, and/or, one or more operating systems 341. e.g., Windows Server™, Mac OS X™ Unix™, Linux™, Free-BSD™ etc.

The steps of the data recovery method described above may be implemented through the structure of the data recovery device.

Embodiment 4

Corresponding to the above method embodiment, embodiments of the present application further provide a readable storage medium, the readable storage medium described below and the data recovery method described above may be referenced with each other.

A readable storage medium is provided, the readable storage medium stores a computer program, and the computer program implements, when being executed by the processor, the steps of the data recovery method of the above method embodiment.

The readable storage media may be USB flash drives, mobile hard disks, read-only memories (ROMs), random access memories (RAMs), magnetic disks or CD-ROMs, or other readable storage media that can store program codes.

Those skilled in the art may further realize that the units and algorithmic steps of the examples described in combination with the embodiments disclosed herein may be implemented in electronic hardware, computer software, or a combination of the two, and that the components and steps of the examples have been described generally by function in the above description to clearly illustrate the interchangeability of hardware and software. Whether these functions are performed in hardware or software depends on the particular application and design constraints of the technical solution. Those skilled in the art may use different methods to implement the described functions for each particular application, but such implementation should not be considered to go beyond the scope of the present application.

The invention claimed is:

1. A data recovery method, comprising:
   receiving and analyzing a data recovery request sent by a monitoring node, and obtaining a total cluster data recovery amount and a total local data recovery amount;
   determining a basic recovery speed by means of the total cluster data recovery amount and the total local data recovery amount;
   performing data recovery according to the basic recovery speed, and compiling statistics on a proportion of recovered small files within a specified number of recovery periods; and
   adjusting the basic recovery speed by means of the proportion of the small files, and performing data recovery according to the adjusted basic recovery speed;
   wherein performing data recovery according to the basic recovery speed comprises:
   determining whether the data recovery speed in the current recovery period is greater than the basic recovery speed;
   if the data recovery speed in the current recovery period is greater than the basic recovery speed, stopping data recovery for the current recovery period;
   if the data recovery speed in the current recovery period is not greater than the basic recovery speed, continuing data recovery.

2. The data recovery method of claim 1, wherein determining a basic recovery speed by means of the total cluster data recovery amount and the total local data recovery amount comprises:
   communicating and interacting with the monitoring node, to determine a cluster recovery speed;
   calculating a ratio of the total local data recovery amount to the total cluster data recovery amount; and
   using the product of the cluster recovery speed and the ratio as the basic recovery speed.

3. The data recovery method of claim 1, wherein adjusting the basic recovery speed by means of the proportion of the small files comprises:
   up-regulating the basic recovery speed when the proportion of the small files is greater than a first threshold; and
   down-regulating the basic recovery speed when the proportion of the small files is less than a second threshold.

4. The data recovery method of claim 3, wherein up-regulating the basic recovery speed comprises:
   increasing the number of objects recovered simultaneously, and increasing the number of objects allowed to be recovered in a single recovery period.

5. The data recovery method of claim 3, wherein down-regulating the basic recovery speed comprises:
   decreasing the number of objects recovered simultaneously, and decreasing the number of objects allowed to be recovered in a single recovery period.

6. The data recovery method of claim 1, wherein before receiving and analyzing a data recovery request sent by a monitoring node, the method further comprises:
   when a storage cluster is in failure, feeding back failure information to the monitoring node, such that the monitoring node may compile statistics on the total cluster data recovery amount and determine the total local data recovery amount based on the failure information.

7. A data recovery device, comprising:
   a memory, configured to store computer programs; and
   a processor, configured to implement, when executing the computer programs, a data recovery method comprising the steps of:
   receiving and analyzing a data recovery request sent by a monitoring node, and obtaining a total cluster data recovery amount and a total local data recovery amount;
   determining a basic recovery speed by means of the total cluster data recovery amount and the total local data recovery amount;
   performing data recovery according to the basic recovery speed, and compiling statistics on a proportion of recovered small files within a specified number of recovery periods; and
   adjusting the basic recovery speed by means of the proportion of the small files, and performing data recovery according to the adjusted basic recovery speed;

wherein performing data recovery according to the basic recovery speed comprises:
  determining whether the data recovery speed in the current recovery period is greater than the basic recovery speed;
  if the data recovery speed in the current recovery period is greater than the basic recovery speed, stopping data recovery for the current recovery period;
  if the data recovery speed in the current recovery period is not greater than the basic recovery speed, continuing data recovery.

8. A readable storage medium, wherein the readable storage medium stores a computer program, and the computer program implements, when being executed by the processor, a data recovery method comprising the steps of:
  receiving and analyzing a data recovery request sent by a monitoring node, and obtaining a total cluster data recovery amount and a total local data recovery amount;
  determining a basic recovery speed by means of the total cluster data recovery amount and the total local data recovery amount;
  performing data recovery according to the basic recovery speed, and compiling statistics on a proportion of recovered small files within a specified number of recovery periods; and
  adjusting the basic recovery speed by means of the proportion of the small files, and performing data recovery according to the adjusted basic recovery speed;
wherein performing data recovery according to the basic recovery speed comprises:
  determining whether the data recovery speed in the current recovery period is greater than the basic recovery speed;
  if the data recovery speed in the current recovery period is greater than the basic recovery speed, stopping data recovery for the current recovery period;
  if the data recovery speed in the current recovery period is not greater than the basic recovery speed, continuing data recovery.

* * * * *